United States Patent
Shariat et al.

(10) Patent No.: US 12,302,439 B2
(45) Date of Patent: May 13, 2025

(54) DYNAMIC PATH SWITCHING

(71) Applicant: Samsung Electronics Co., Ltd., Suwon-si (KR)

(72) Inventors: Mehrdad Shariat, Staines (GB); Hoyeon Lee, Suwon-si (KR); Sunghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 17/765,680

(22) PCT Filed: Sep. 28, 2020

(86) PCT No.: PCT/KR2020/013272
§ 371 (c)(1),
(2) Date: Mar. 31, 2022

(87) PCT Pub. No.: WO2021/066485
PCT Pub. Date: Apr. 8, 2021

(65) Prior Publication Data
US 2022/0369408 A1    Nov. 17, 2022

(30) Foreign Application Priority Data

Oct. 4, 2019   (GB) ..................................... 1914327
Oct. 4, 2019   (GB) ..................................... 1914350

(51) Int. Cl.
*H04W 76/23*        (2018.01)
(52) U.S. Cl.
CPC .................... *H04W 76/23* (2018.02)
(58) Field of Classification Search
CPC ....... H04W 76/23; H04W 4/023; H04W 4/80; H04W 76/14; H04W 76/22; H04W 88/06
See application file for complete search history.

(56) References Cited

U.S. PATENT DOCUMENTS 11,653,248 B2 *  5/2023  Na ........................ H04W 28/10
                                                                370/329
2013/0324114 A1  12/2013  Raghothaman et al.
(Continued)

FOREIGN PATENT DOCUMENTS

EP       3 893 558 A1    10/2021
WO    2013/170482 A1    11/2013
(Continued)

OTHER PUBLICATIONS

United Kingdom Search and Examination Report dated Jun. 15, 2022, issued in United Kingdom Patent Application No. GB1914327.0.
(Continued)

*Primary Examiner* — Dady Chery
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to the embodiments of the present disclosure, various methods by which the 5G system is able to dynamically determine the appropriate UP path to exchange interactive service data either via the ProSe Communication path (direct) or via the 5GC path are provided. Also, according to the embodiments of the present disclosure, a method of addressing shortcomings in a discovery procedure related to the formation and management of such NCIS groups is provided.

8 Claims, 17 Drawing Sheets

(56) References Cited

U.S. PATENT DOCUMENTS

| | | | |
|---|---|---|---|
| 2015/0094064 A1 | 4/2015 | Lei et al. | |
| 2015/0156702 A1* | 6/2015 | Stojanovski | H04L 41/0836 370/328 |
| 2017/0149669 A1* | 5/2017 | Xu | H04L 67/34 |
| 2017/0164332 A1* | 6/2017 | Kim | H04W 72/02 |
| 2019/0007500 A1 | 1/2019 | Kim et al. | |
| 2019/0159157 A1 | 5/2019 | Gupta | |
| 2019/0230734 A1 | 7/2019 | Shimojou et al. | |
| 2021/0289572 A1* | 9/2021 | Deng | H04W 76/14 |
| 2021/0344638 A1* | 11/2021 | Chen | H04L 67/1012 |
| 2021/0345237 A1 | 11/2021 | Ge et al. | |
| 2022/0286900 A1* | 9/2022 | Lu | H04W 76/14 |

FOREIGN PATENT DOCUMENTS

| | | |
|---|---|---|
| WO | 2014/088819 A2 | 6/2014 |
| WO | 2018/182603 A1 | 10/2018 |

OTHER PUBLICATIONS

OPPO, Proposal for Consolidated Requirements—Group Operation, vol SA WG1, 2019, "NCIS use case—Proposal for Consolidated Requirements—Group", 3GPP TSG-SA WG1 Meeting #86, Suzhou, P. R. China, S1-191501, May 6-10, 2019.

3rd Generation Partnership Project, 2015, "3rd Generation Partnership Project; Technical Specification Group Services and System Aspects; Study on application architecture to support Mission Critical Push to Talk over LTE (MCPTT) services (Release 13)" 3GPP TR 23.779 v2.0.0, Section 5.8.2.1., pp. 174-177, Sep. 25, 2015.

3GPP TR 22.842 V17.0.0, 3rd Generation Partnership Project; Technical Specification Group Services and System Aspects; Study on Network Controlled Interactive Services (Release 17), Jun. 21, 2019.

3GPP TS 23.303 V15.1.0, 3rd Generation Partnership Project; Technical Specification Group Services and System Aspects; Proximity-based services (ProSe); Stage 2 (Release 15), Jun. 19, 2018.

3GPP TS 23.502 V16.1.1, 3rd Generation Partnership Project; Technical Specification Group Services and System Aspects; Procedures for the 5G System; Stage 2, (Release 16), Jun. 11, 2019.

Great Britain Search and Examination Report dated Mar. 26, 2020, issued in Great Britain Application No. 1914327.0.

Great Britain Search and Examination Report dated Mar. 19, 2020, issued in Great Britain Application No. 1914350.2.

Great Britain Examination Report dated Dec. 16, 2021, issued in Great Britain Application No. 1914327.0.

Great Britain Examination Report dated Feb. 24, 2022, issued in Great Britain Application No. 1914327.0.

Great Britain Examination Report dated Jan. 27, 2022, issued in Great Britain Application No. 1914350.2.

3GPP TR 23.795 V16.1.0, 3rd Generation Partnership Project; Technical Specification Group Services and System Aspects; Study on application layer support for V2X services; (Release 16), Dec. 21, 2018.

Extended European Search Report dated Sep. 8, 2022, issued in European Patent Application No. 20872783.4.

European Office Action dated Apr. 11, 2024, issued in European Application No. 20 872 783.4-1218.

* cited by examiner

DYNAMIC PATH SWITCHING

TECHNICAL FIELD

The present disclosure relates to the dynamic switching of communication paths in the context of a mobile device or user equipment (UE) operable with a telecommunication network. It relates particularly to the switching between a first and second mode of communication between two UEs where one involves direct communication between the devices and the other involves the telecommunication network relaying all messages and signals.

The present disclosure also relates to improvements in proximity services (ProSe) in the context of commercial or public safety applications.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In addition to the above, proximity services (ProSe) have been developed in evolved packet system (EPS) from LTE Rel-12 to support both commercial and public safety services. In 3GPP Rel-14, the ProSe (specifically the direct communication) has been enhanced to support vehicle to everything (V2X) services over LTE. For fifth generation systems (5GS), the proximity services are expected to be an important system wide enabler to support various applications and services.

Another class of commercial services has recently emerged termed as network-controlled interactive services (NCIS) that share some commonality of requirements with public safety services and applications. NCIS refers to a kind of service which needs at least 2 UEs to join and share data, e.g. interactive gaming or data sharing. Those UEs in the same NCIS session are grouped together as one NCIS group, and the group is determined by application layer (i.e. NCIS application server).

Many interactive services occur in localized areas e.g. entertainment in a home party or a bar, or educational services in an office, or interactive gaming in an entertainments centre, or new generation of augmented reality/virtual Reality (AR/VR) services improving the user experience at different venues like shopping malls, stadiums or other social events.

It is desirable that the 5G System be enhanced to support proximity-based services with one common architecture to take advantage of economies of scale, i.e. such architecture can be used for both public safety and commercial proximity services, where applicable.

For either form of service (Public Safety and commercial services), the requirements for throughput, latency, reliability and resource/power utilization may be enhanced by employing dynamic path switching schemes where direct communication in the user plane (UP) with other users in proximity service(ProSe), termed as the ProSe Communication path, enables another degree of freedom to maintain service quality of experience, in addition to the conventional path through core network i.e. 5GC path between users.

DISCLOSURE OF INVENTION

Technical Problem

In order to guarantee service requirements such as user data rate and latency requirements for different proximity applications, there is a need for a method by which the 5G system is able to dynamically determine the appropriate UP path to exchange interactive service data either via the ProSe Communication path (direct) or via the 5GC path.

Also, there is a need for a method of addressing shortcomings in a discovery procedure related to the formation and management of such NCIS groups.

Solution to Problem

According to the present disclosure there is provided an apparatus and method as set forth in the appended claims.

Other features of the disclosure will be apparent from the dependent claims, and the description which follows.

According to an aspect of the present disclosure, there is provided a method of path switching in a system where a first user equipment (UE) is operable to communicate with a second UE via either a first direct path or a second path via a telecommunication network and wherein the active path is switched between the first and second paths, or vice-versa, in response to a trigger derived from: a) either one of the first and second UEs; b) the telecommunication network; or c) an application running on one of the UEs.

In an embodiment, the first path is a ProSe path and the second path is via a 5G Core network (5GC).

In an embodiment, the active path is switched, Quality of Service (QoS) parameters are mapped between the two paths.

In embodiments, various signal flows are created as set out in the description.

Embodiments of the disclosure provide novel procedures, notification parameters, call flows and triggers for dynamic path switching between ProSe path and 5GC path in different scenarios either for public safety applications or for network-controlled interactive services.

Embodiments of the disclosure provide novel (or enhanced) signalling procedures and exchange of parameters related to QoS indication, handling and mapping QoS parameters between ProSe path and 5GC path.

Embodiments of the disclosure provide novel triggers for path switching based on relative proximity changes observed by UE (UE-driven), QoS changes observed by radio-access network (Network-driven) or group topology changes observed by application function (AF-driven).

According to another aspect of the present disclosure, there is provided a method of configuring a group of user equipments (UEs), for proximity services, wherein the UEs to form the group are selected according to a combination of proximity to each other and also according to a directional relationship between them.

In an embodiment, a configuration update for the group of UEs is triggered due to a topology change observed within a Network Function of a telecommunication system within which the group of UEs is operating.

In an embodiment, a configuration update for the group of UEs is triggered due to a change observed in group charging policy within a network function of a telecommunication system within which the group of UEs is operating.

Although a few preferred embodiments of the present disclosure have been shown and described, it will be appreciated by those skilled in the art that various changes and modifications might be made without departing from the scope of the disclosure, as defined in the appended claims.

Advantageous Effects of Invention

According to the embodiments of the present disclosure, various methods by which the 5G system is able to dynamically determine the appropriate UP path to exchange interactive service data either via the ProSe Communication path (direct) or via the 5GC path are provided.

According to the embodiments of the present disclosure, a method of addressing shortcomings in a discovery procedure related to the formation and management of such NCIS groups is provided.

BRIEF DESCRIPTION OF DRAWINGS

For a better understanding of the disclosure, and to show how embodiments of the same may be carried into effect, reference will now be made, by way of example only, to the accompanying diagrammatic drawings in which.

Throughout the drawings, like reference numerals will be understood to refer to like parts, components, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The term and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 17, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

Figure 1:
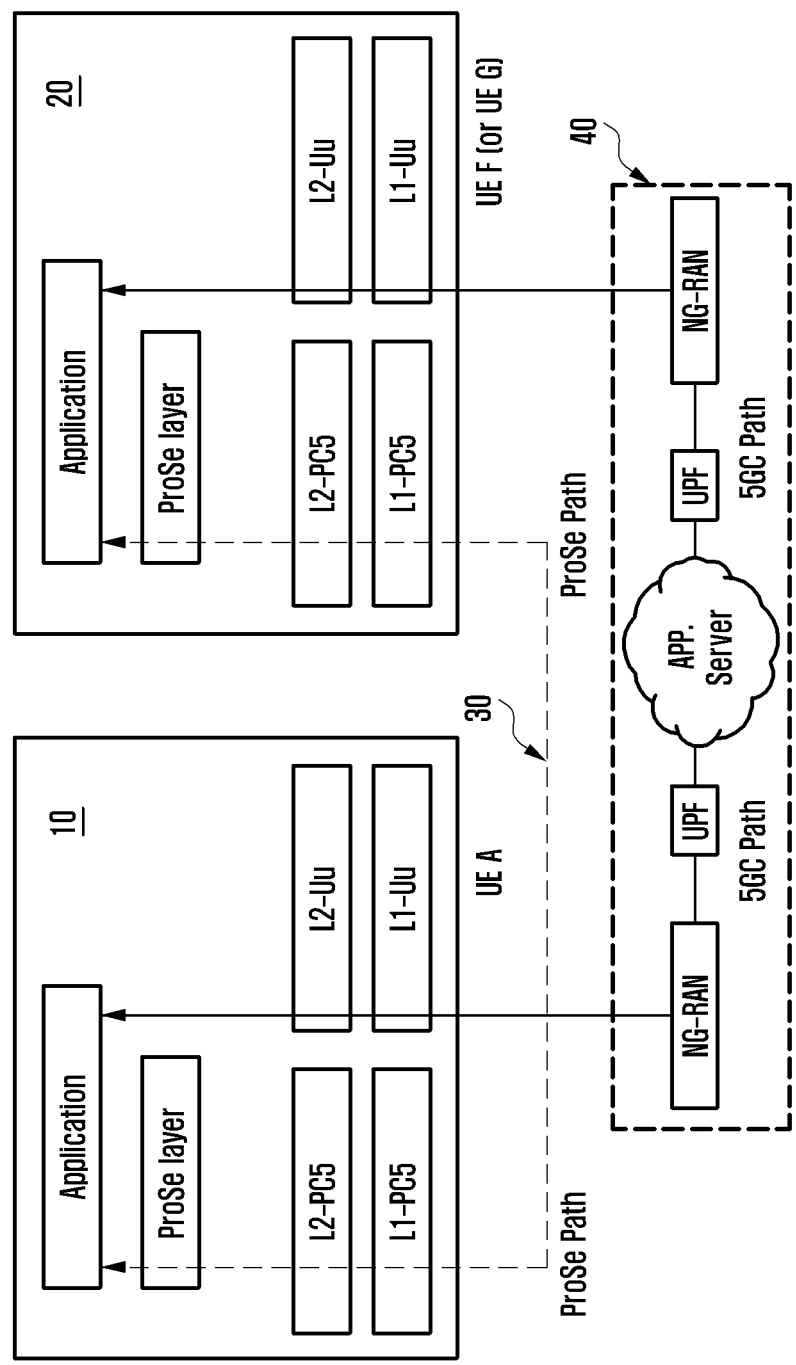
FIG. 1 illustrates an example of ProSe path and 5GC path between two UEs, according to an embodiment of the present disclosure.

FIG. 1 illustrates an example of ProSe path and 5GC path between two UEs, according to an embodiment of the present disclosure.

Referring to the FIG. 1, a first UE (10) in communication with a second UE (20).

The communication between the two UEs may be performed via a ProSe path (30) or via the 5G Core (40).

In order to guarantee service requirements such as user data rate and latency requirements for different proximity applications, it is desirable that the 5G system is able to dynamically determine the appropriate UP path to exchange interactive service data either via the ProSe Communication path (direct) or via the 5GC path as illustrated in FIG. 1.

In the following embodiments of the disclosure, it is assumed that two example users, referred to as UE A (10) and UE F/G (20) have already established a Public Safety/NCIS session together over 5GC path (40) but due to some triggering condition to be described below, they decide to switch the path from 5GC (40) to a ProSe (30) direct communication path to continue their joint session.

Figure 2:
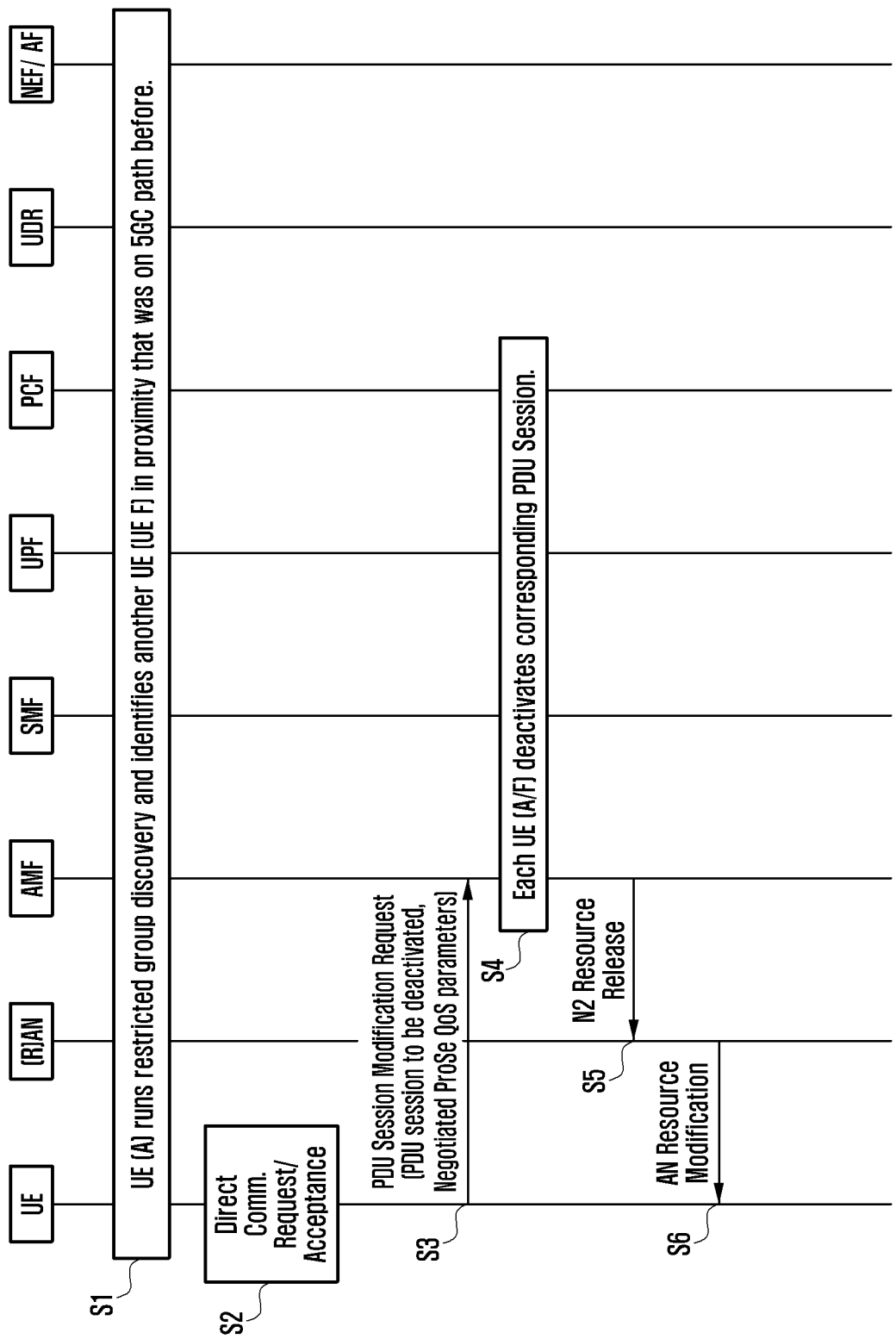
FIG. 2 illustrates a representation of a call flow according to an embodiment of the present disclosure.

FIG. 2 illustrates a first scenario according to an embodiment of the present disclosure. This represents a UE-driven path switch from 5GC path to ProSe path.

FIG. 2, and the following figures, show various network functions/entities, whose functions and definitions are known in the art in at least: 3GPP TS 23.501, 3GPP TS 23.502 and 3GPP TS 23.503. The various known functions of these network functions/entities is varied/enhanced as set out in the following paragraphs.

For completeness, the various functions/entities shown may be:
user equipment: UE, (radio) access network: (R)AN, access and mobility management function: AMF, session management function: SMF, user plane function: UPF, policy control function: PCF, unified data repository: UDR, network exposure function: NEF, application function: AF.

In this scenario, it is assumed that UE A (10) runs periodic group discovery over PC5-D in coordination with an application server, even though it is already in a Public Safety/NCIS session with UE F (20) over 5GC path (40). Alternatively, UE A (10) may be triggered to run group discovery based on a proximity "notification alert" from proximity function (PF) in a similar manner as captured in TS 23.303 for LTE ProSe.

In 5G Core (5GC), the corresponding services for proximity "notification alert" may be deployed as an extended set of services for a current network function (NF) within 5GC (e.g. PCF) or as part of a newly added NF for this purpose within service-based architectures (SBA).

Figure 3:
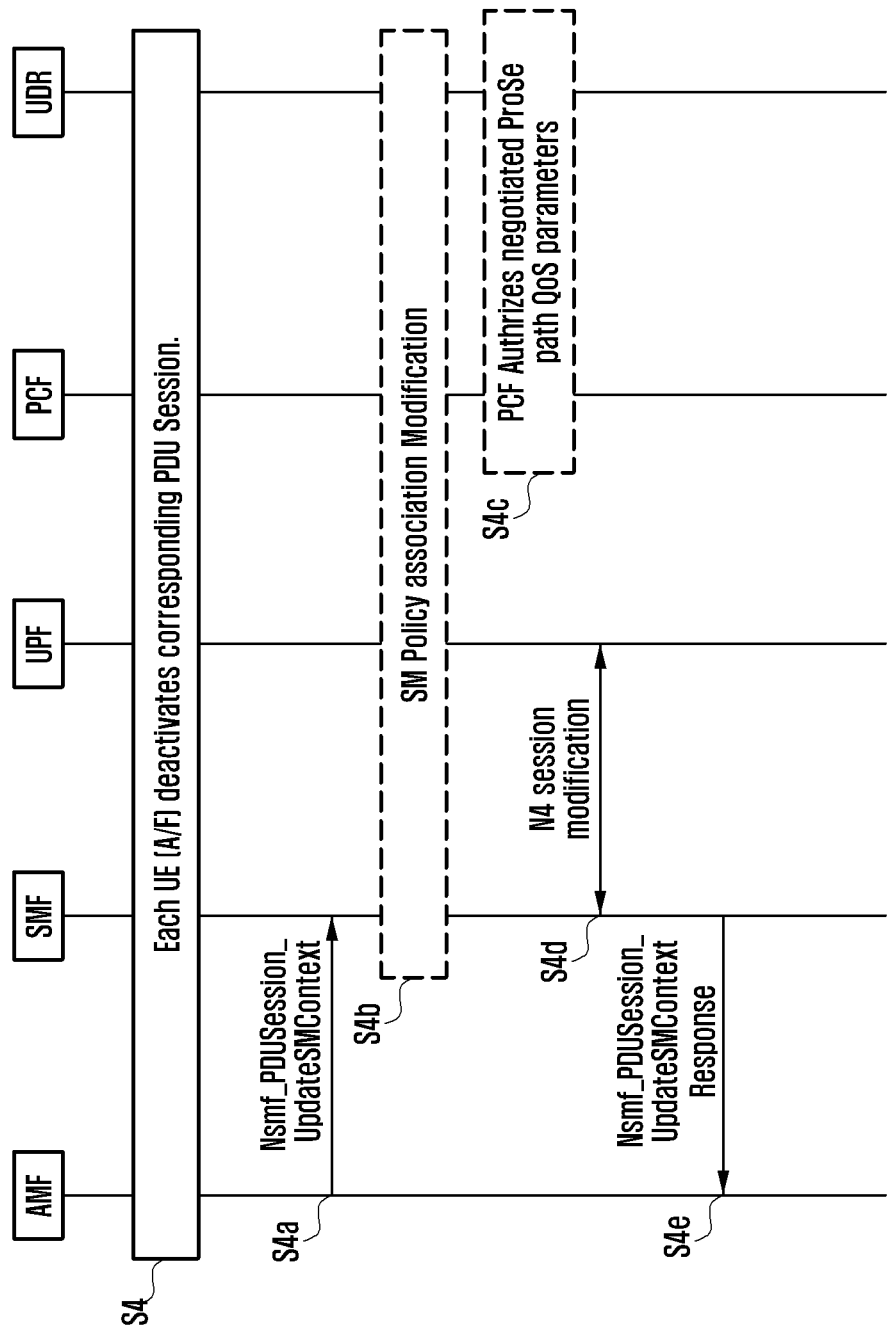
FIG. 3 illustrates more detail of a step shown in FIG. 2.

The service flow steps for the first scenario shown in FIG. 2 are as below. Note that FIG. 3 shows a more detailed view of step S4

Details of each step are:
S1. During Group discovery, as described above, UE A (10) identifies that UE F (20) has moved to the proximity range of UE A (10).

S2. UE A (10) transmits direct communication request to initiate the unicast layer-2 link establishment. This request also includes PC5 QoS flows/parameters (for ProSe path) mapped based on former 5GC path QoS parameters to meet Public Safety/NCIS session service requirements. UE F (20) accepts the direct communication request and confirms the support of ProSe path QoS flows/parameters received. QoS parameters are mapped between the two paths to ensure that a suitable or required level of service is experienced by the UEs after the active path has been switched. If the new path does not satisfy QoS requirements, then path switching does not proceed.

S3. Both UEs (10, 20) initiate PDU session modification request for the pair of Uu links involved (over 5GC path) also including a new parameter "PDU session to be deactivated". They also include the negotiated ProSe path QoS parameters in the request.

S4. PDU session modification/deactivation is described in more detail in FIG. 3:

S4a. The AMF invokes "Nsmf_PDUSession_UpdateSMContext" including "SM Context ID" and "N2 SM information".

S4b. SMF initiates SM policy association modification where PCF is also updated based on SM policy association modification.

S4c. PCF (or any newly defined NF taking the role) authorizes negotiated ProSe path QoS parameters and accordingly updates the UDR.

S4d. The SMF transmits an N4 Session Modification Request (if any) message to the UPF of the PDU Session and UPF proceeds with any changes and acknowledges the modification.

S4e. SMF responds the AMF on "Nsmf_PDUSession_UpdateSMContext".

S5. The AMF transmits N2 resource release message to the (R)AN.

S6. The relevant resources on access network (AN) level are released/modified.

Following the above steps, the Public Safety/NCIS session continues over the direct link established between UE A (10) and UE F (20).

Figure 4:
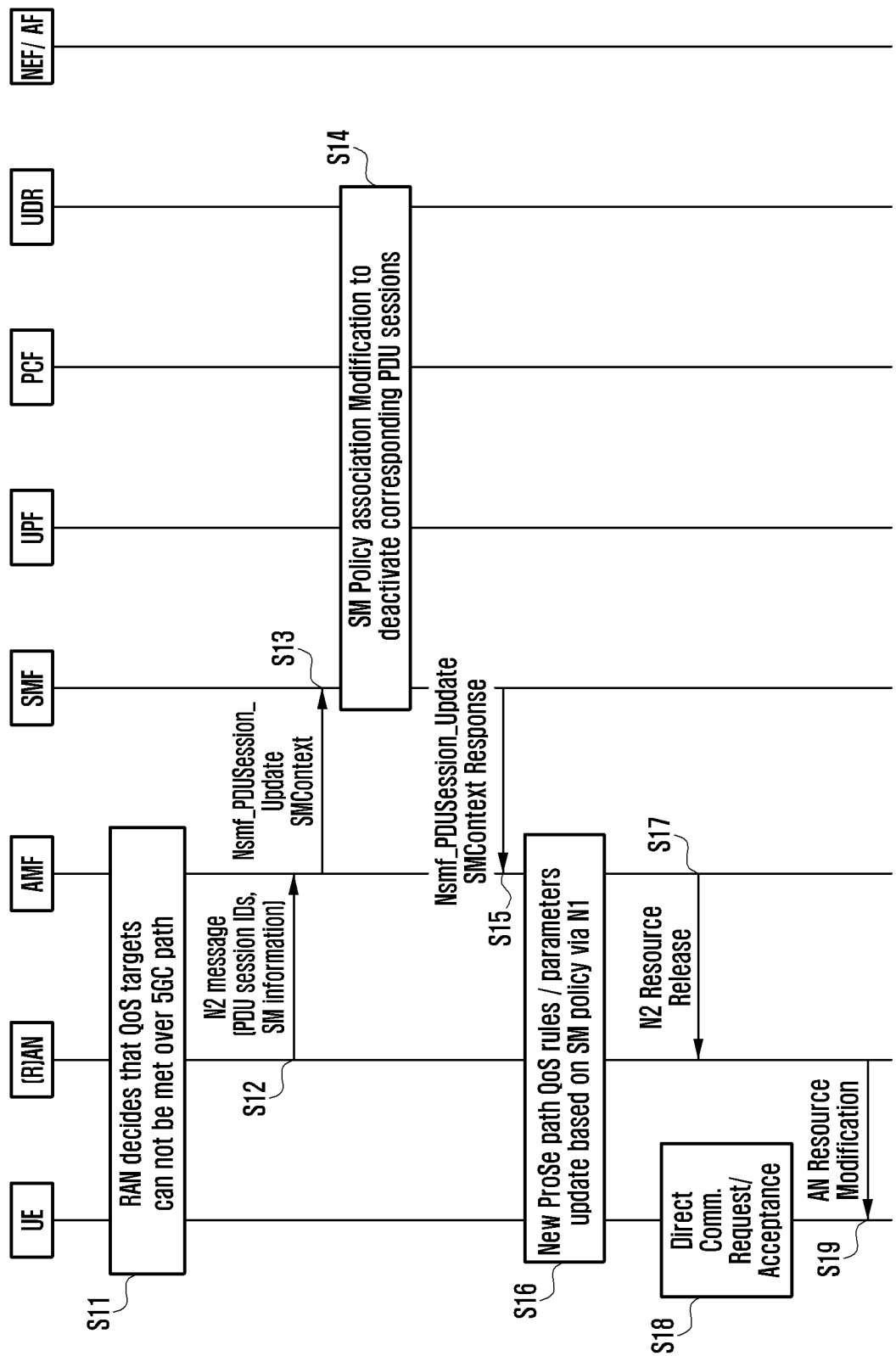
FIG. 4 illustrates a representation of a call flow according to an embodiment of the present disclosure.

FIG. 4 illustrates a second scenario according to an embodiment of the present disclosure. This scenario represents a network-driven path switch from 5GC path to ProSe path.

In this scenario, it is assumed that RAN-level triggers initiate a path switch from 5GC path to ProSe path.

The service flow steps for the second scenario shown in FIG. 4 are as below.

Details of each step are:
S11. (R)AN decides that the Public Safety/NCIS QoS requirements cannot be met over 5GC path based on UE (L1/L2) measurement reports over Uu or some newly imposed admission control policy.

S12. (R)AN transmits a newly proposed QoS notification N2 message including related PDU session ID(s), N2 SM information to the AMF. Unlike AN initiated notification control as captured in 23.502, it is assumed that the newly proposed QoS notification is applicable for both GBR and non-GBR flows when a target QoS parameter cannot be met.

S13. The AMF invokes "Nsmf_PDUSession_UpdateSMContext" including "SM Context ID" and "N2 SM information."

S14. SMF initiates SM policy association modification to deactivate both PDU sessions over 5GC path. PCF is also updated based on SM policy association modification.

S15. SMF responds the AMF on "Nsmf_PDUSession_UpdateSMContext". This may include N1 SM container that carries the "PDU Session Modification Command" that the AMF shall provide to the UE. In particular, N1 SM Container may include new ProSe path QoS rules and parameters for ProSe path communication.

S16. The AMF transfers the SM container to the corresponding UEs via N1.

S17. The AMF also transmits N2 resource release message to the (R)AN.

S18. At the same time, UE A (10) transmits direct communication request to initiate the unicast layer-2 link establishment incl. ProSe path QoS rules and parameters provided by the network. UE F (20) accepts the request and confirms the support of ProSe path QoS flows/parameters received.

S19. Relevant resources on AN-level are released/modified.

Following the above steps, the Public Safety/NCIS session continues over the direct link established between UE A (10) and UE F (20).

Figure 5:
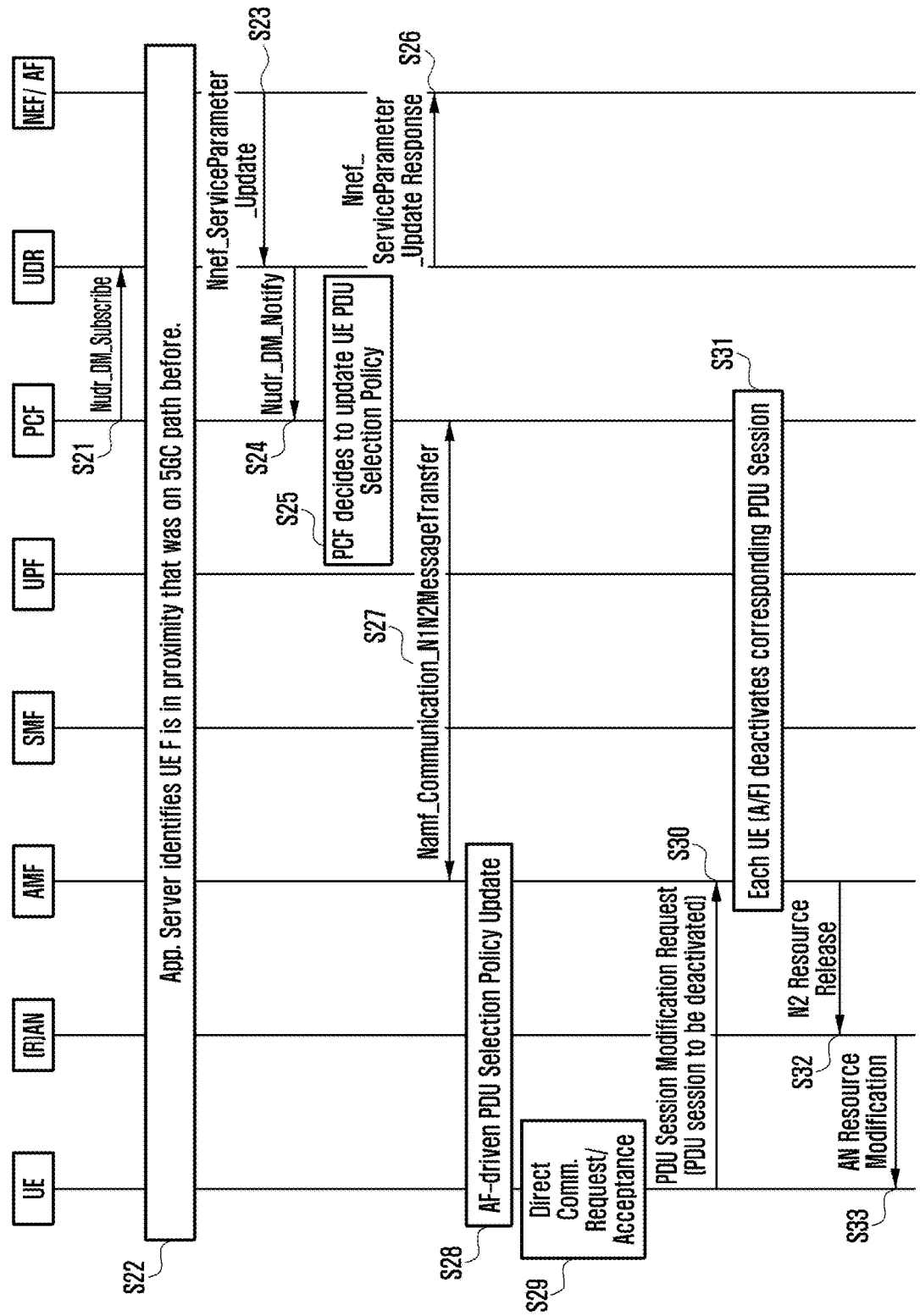
FIG. 5 illustrates a representation of a call flow according to an embodiment of the present disclosure.

FIG. 5 illustrates a third scenario according to an embodiment of the present disclosure. This scenario represents an application-driven path switch from 5GC path to ProSe path.

In this scenario, it is assumed that the application server (at application function—AF level) notices a change in network topology/proximity arrangement and decides to initiate a path switch from 5GC path to ProSe path. Furthermore, it is assumed that PCF (or any newly added NF taking its role) has already subscribed to UDR to receive notifications on any service parameter updates from application server.

The service flow steps for the third scenario as illustrated in FIG. 5 are as below.

Details of each step are:

S21. PCF subscribes to UDR to receive notifications on any service-level parameter changes.

S22. The application server during a direct group discovery by UE A (10) (over PC5-D) identifies UE F (20) has moved to the proximity range for the current service. Similar to the first scenario, direct group discovery either runs periodically or may be triggered based on a proximity "notification alert" from PF (or any other new NF taking that role within 5GC) as already captured in TS 23.303.

S23. The application server invokes a "ServiceParameter_Update" service operation through NEF as an AF.

S24. The NEF stores the application server provided information within the UDR.

S25. The PCF receives the notification of data change from UDR (which it has already subscribed to in step S21.).

S26. NEF responds on "ServiceParameter_Update" to the AF.

S27. PCF initiates PDU selection policy update via invoking "N1N2MessageTransfer" communication service provided by AMF.

S28. The PDU selection policy update is conveyed to UEs (A, F) via N1 DL message.

S29. UE A (10) transmits direct communication request to initiate the unicast layer-2 link establishment incl. ProSe path QoS rules and parameters provided by the AF/PCF. UE F (20) accepts the request and confirms the support of ProSe path QoS flows/parameters received.

S30. Both UEs initiate PDU session modification request for the pair of Uu links (over 5GC path) including the newly proposed parameter "PDU session to be deactivated".

S31. PDU session modification is followed in similar steps as shown in FIG. 3, except step S4c. (relating PCF authorization) is omitted.

S32. The AMF also transmits N2 resource release message to the (R)AN.

S33. Relevant resources on AN-level are released/modified.

Following the above steps, the Public Safety/NCIS session continues over the direct link established between UE A (10) and UE F (20).

In the following embodiments it is assumed that two example users termed as UE A (10) and UE G (20) have already established a Public Safety/NCIS session together over a ProSe path but due to some triggering condition, as described below, they decide to switch from ProSe direct communication path to 5GC path to continue their joint session.

Figure 6:
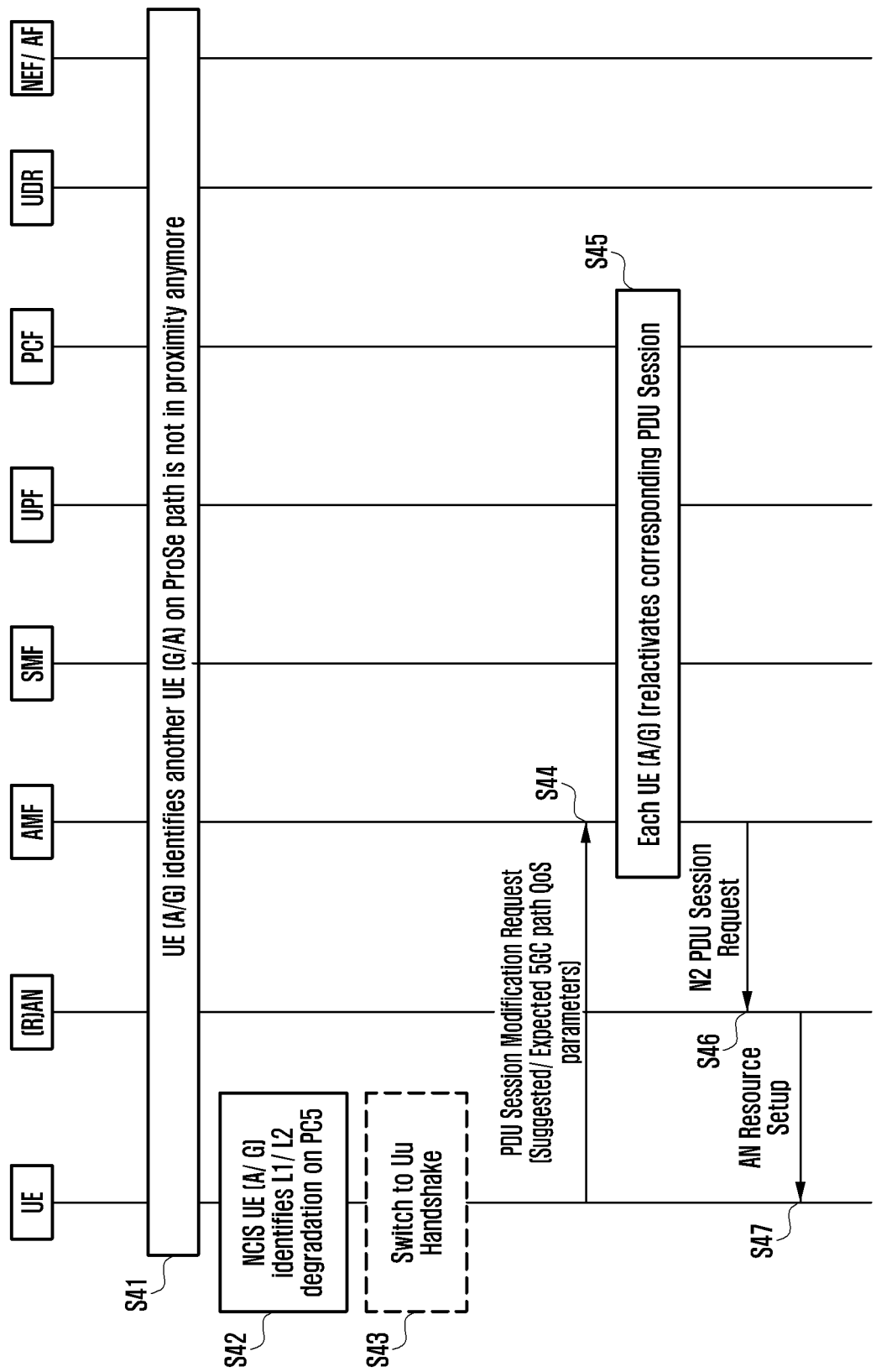
FIG. 6 illustrates a representation of a call flow according to an embodiment of the present disclosure.
Figure 7:
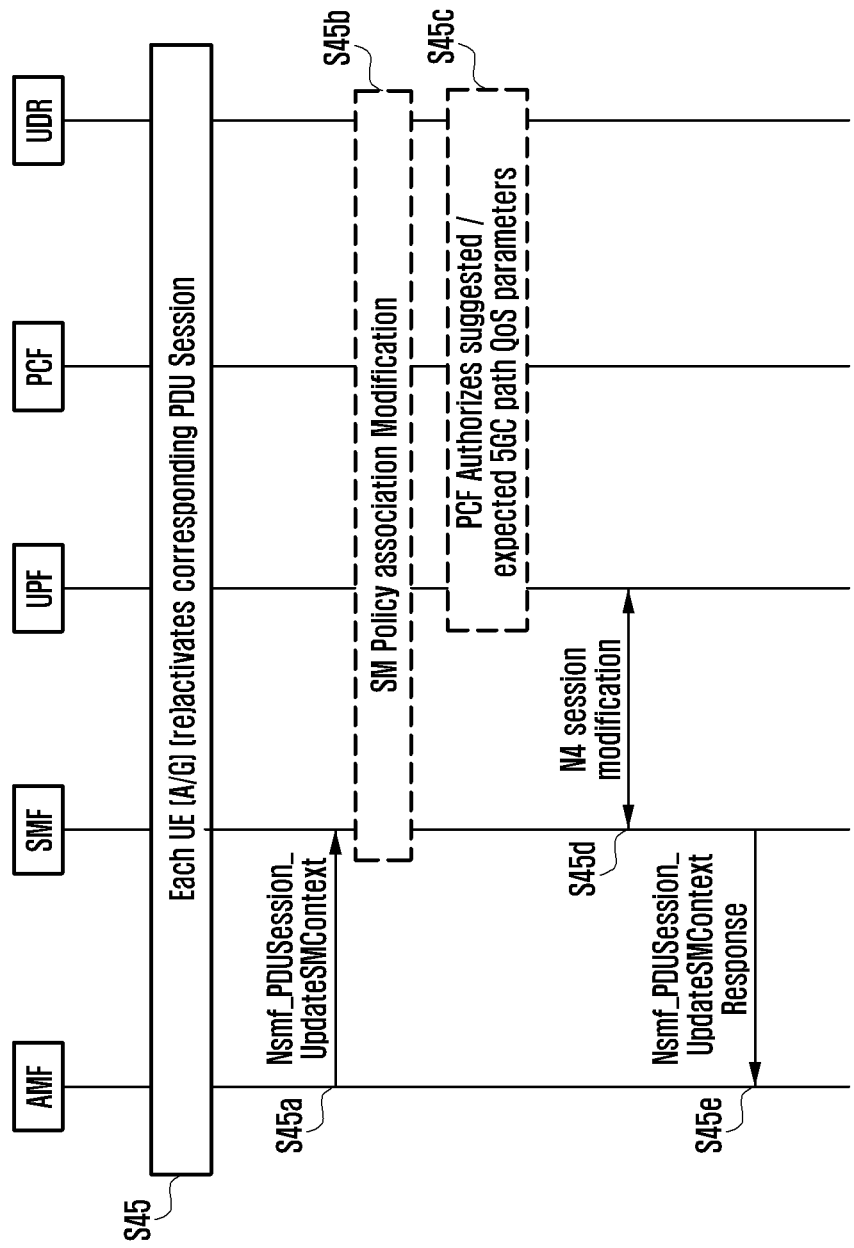
FIG. 7 illustrates more detail of a step shown in FIG. 6.

FIG. 6 illustrates a fourth scenario according to an embodiment of the present disclosure. This represents a UE-driven path switch from ProSe path to 5GC path UE A (10) and UE G (20) have already established a Public Safety/NCIS session over ProSe path when they were in proximity. The service flow steps for this fourth scenario as shown in FIGS. 6 and 7 and as set out below.

Details of each step are:

S41. [Trigger a] UE A (10) during direct group discovery identifies UE G (20) is moving out of the proximity range for the current service. Similar to the first and third scenarios (illustrated in FIGS. 2 and 5), direct group discovery either runs periodically or may be triggered based on a proximity "notification alert" from PF (or any other new NF taking that role within 5GC) as already captured in TS 23.303.

S42. [Trigger b] Due to degradation in channel state based on L1/L2 measurements and indications on PC5-U, either UE A (10) or G (20) identifies that the ProSe path QoS requirements cannot be supported anymore.

S43. [Based on Trigger b, conditional to PC5-S availability] UE A (10) notifies UE G (20) for path switch to 5GC path via PC5-S. This request also includes suggested 5GC path QoS flows/parameters mapped based on former ProSe path QoS parameters to meet Public Safety/NCIS session service requirements. UE G (20) accepts the path switch request and confirms support of 5GC path QoS flows/parameters received.

S44. Both UEs initiate PDU session modification request to (re)activate 5GC path via Uu links. They also specify packet filters based on either suggested 5GC path QoS parameters over PC5-S (conditional to PC5-S availability) or expected 5GC path QoS parameters given the former ProSe path QoS parameters and pre-configured rules within UEs.

S45. Each UE (re)activates corresponding PDU session over 5GC path following procedure illustrated in FIG. 7 (similar to the situation illustrated in FIG. 3), in particular PCF authorizes the suggested/expected 5GC path QoS parameters for UE A (10) and UE G (20) and updates UDR accordingly.

S46. The AMF transmits N2 PDU session (re-activation) request message to the (R)AN.

S47. (R)AN sets up the related AN-level resources.

Following the above steps, the Public Safety/NCIS service continues over the 5GC path established between UE A (10) and UE G (20).

Figure 8:
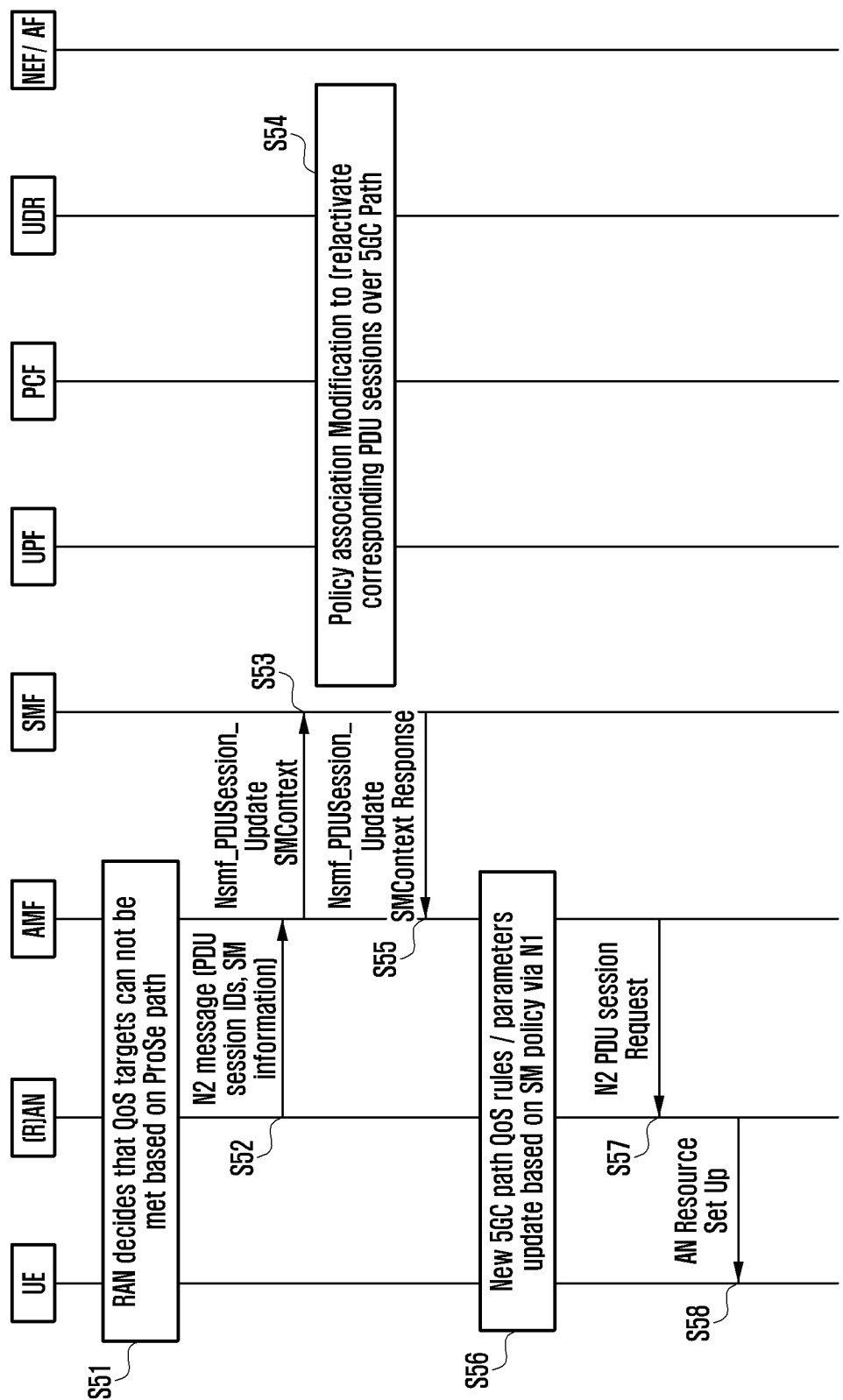
FIG. 8 illustrates a representation of a call flow according to an embodiment of the present disclosure.

FIG. 8 illustrates a fifth scenario according to an embodiment of the present disclosure. This scenario represents a Network-driven path switch from ProSe path to 5GC path.

In this scenario, it is assumed that RAN-level triggers initiate a path switch from ProSe path to 5GC path.

The service flow steps for the fifth scenario shown in FIG. 8 are as below.

Details of each step are:

S51. (R)AN decides that the Public Safety/NCIS QoS requirements cannot be met over PC5 based on UE measurements (over PC5-U) and a corresponding notification.

S52. (R)AN transmits an N2 message including "PDU Session ID(s)" and "N2 SM information" to the AMF.

S53. The AMF invokes "Nsmf_PDUSession_UpdateSM-Context" including "SM Context ID" and "N2 SM information".

S54. SMF initiates SM policy association modification to (re)activate (or establish) PDU sessions over 5GC path. PCF is also updated based on SM policy association modification.

S55. SMF responds the AMF on "Nsmf_PDUSession_UpdateSMContext". This includes N1 SM container that carries the "PDU Session Modification Command".

S56. The AMF transfers the SM container to the corresponding UEs via N1. N1 SM Container includes new 5GC QoS rules and parameters.

S57. The AMF transmits N2 PDU session (re-activation) request message to the R(AN).

S58. (R)AN sets up related AN-level resources.

Following the above steps, the Public Safety/NCIS service continues over 5GC path established between UE A (10) and UE G (20).

Figure 9:
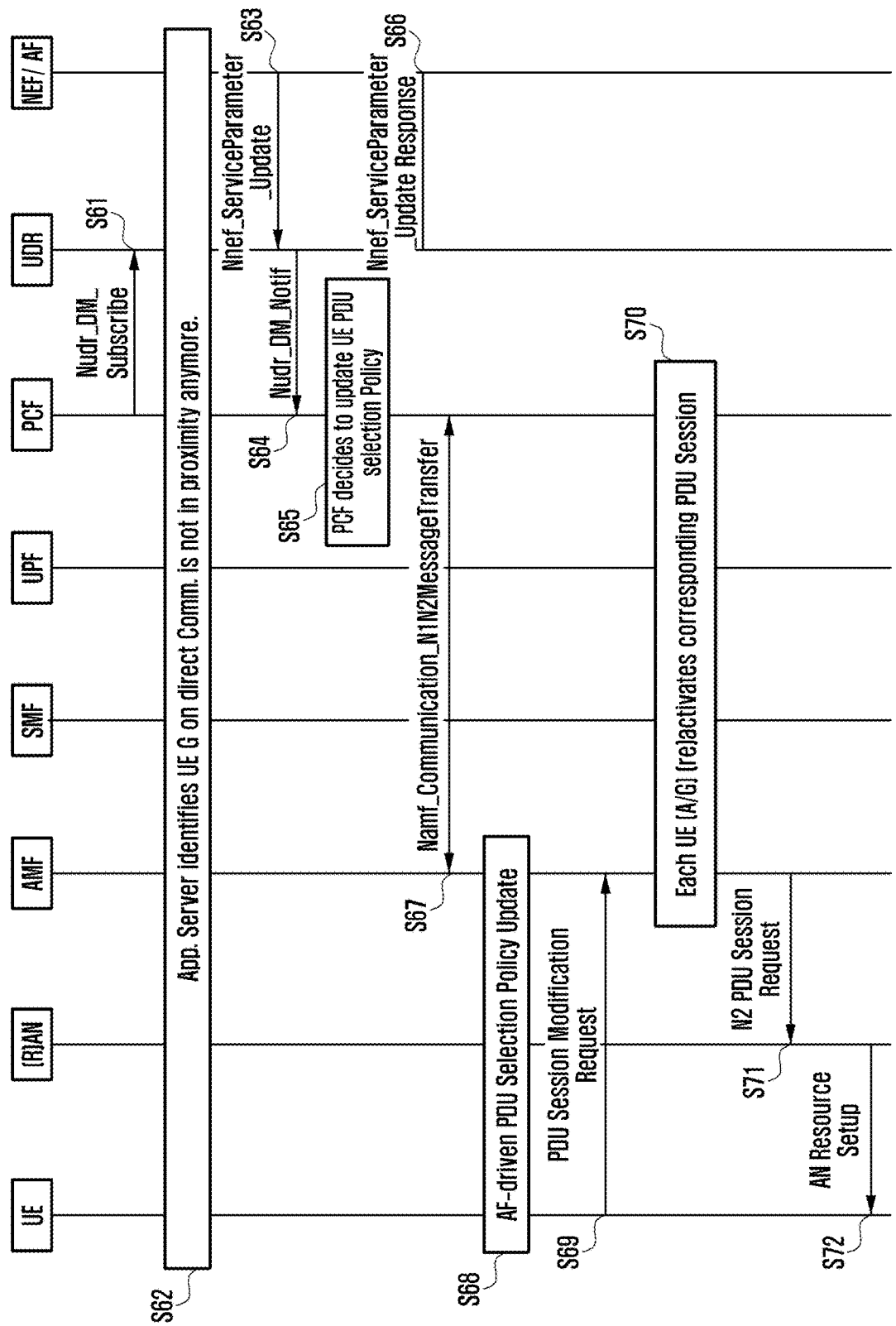
FIG. 9 illustrates a representation of a call flow according to an embodiment of the present disclosure.

FIG. 9 illustrates a six scenario according to an embodiment of the present disclosure. This scenario represents an application-driven path switch from ProSe path to 5GC path.

In this scenario, it is assumed that Application server (at application function level) notices a change in network topology/proximity arrangement and decides to initiate a path switch from ProSe path to 5GC path. Furthermore, it is assumed that PCF (or any newly added NF taking its role) has already subscribed to UDR to receive notifications on any service parameters update from application server.

The service flow steps for the sixth scenario shown in FIG. 9 are as below.

Details of each step are:

S61. PCF subscribes to UDR to receive notifications on any service-level parameter changes.

S62. The application server (App. Server) during a direct group discovery by UE A (10) (over PC5-D) identifies UE G (20) is moving out of the proximity range for the current service. This is similar to the first, their and fourth scenario set out above, where direct group discovery either runs periodically or may be triggered based on a proximity "notification alert" from PF (or any other new NF taking that role within 5GC) as already captured in TS 23.303.

S63. The application server invokes a "ServiceParameter_Update" service operation through NEF as an AF.

S64. The NEF stores the application server provided information within the UDR.

S65. The PCF receives the notification of data change from UDR (which it has already subscribed to in step S61.

S66. NEF responds on "ServiceParameter_Update" to the AF.

S67. PCF initiates PDU selection policy update via invoking "N1N2MessageTransfer" communication service provided by AMF.

S68. The PDU selection policy update is conveyed to UEs (A, G) via N1 DL message.

S69. Both UEs initiate PDU session modification request to reactivate 5GC path via Uu links. They also specify packet filters based on 5GC QoS parameters provided by AF/PCF in the request.

S70. PDU session reactivation is followed as captured in FIG. 7 (fourth scenario), except step S45c (on PCF authorization) is omitted.

S71. The AMF transmits N2 PDU session (re-activation) request message to the (R)AN.

S72. (R)AN sets up related AN-level resources.

Following the above steps, the Safety/NCIS service continues over 5GC path established between UE A (10) and UE G (20).

By means of one of the aforementioned embodiments, it is possible to switch (in either direction) path between ProSe and 5GC. The embodiments set out the possible triggers for such a switch and the steps which are required in order to activate the switch.

Although presented in terms of ProSe and 5GC, the skilled person will readily appreciate that other network topologies and/or protocols which rely on direct communication between UEs and also network-driven communication between the same devices will benefit from embodiments of the disclosure.

The new generation of services referred to above are not only reliant on proximity but also directions of interest. The directions of interest come from user intent and environmental context. This simplifies and/or accelerates the discovery procedure by limiting the search space to one or more specific directions. It also helps to improve power consumption during the discovery procedure. It may additionally enable more customized location-dependent charging mechanisms.

Figure 10:
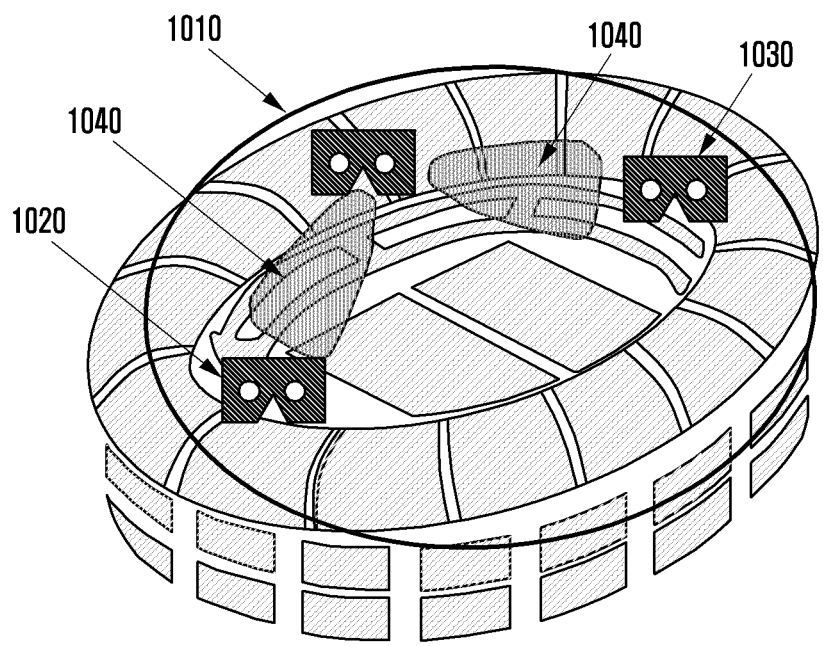
FIG. 10 illustrates sample environments in which embodiments of the disclosure find utility.
Figure 11:
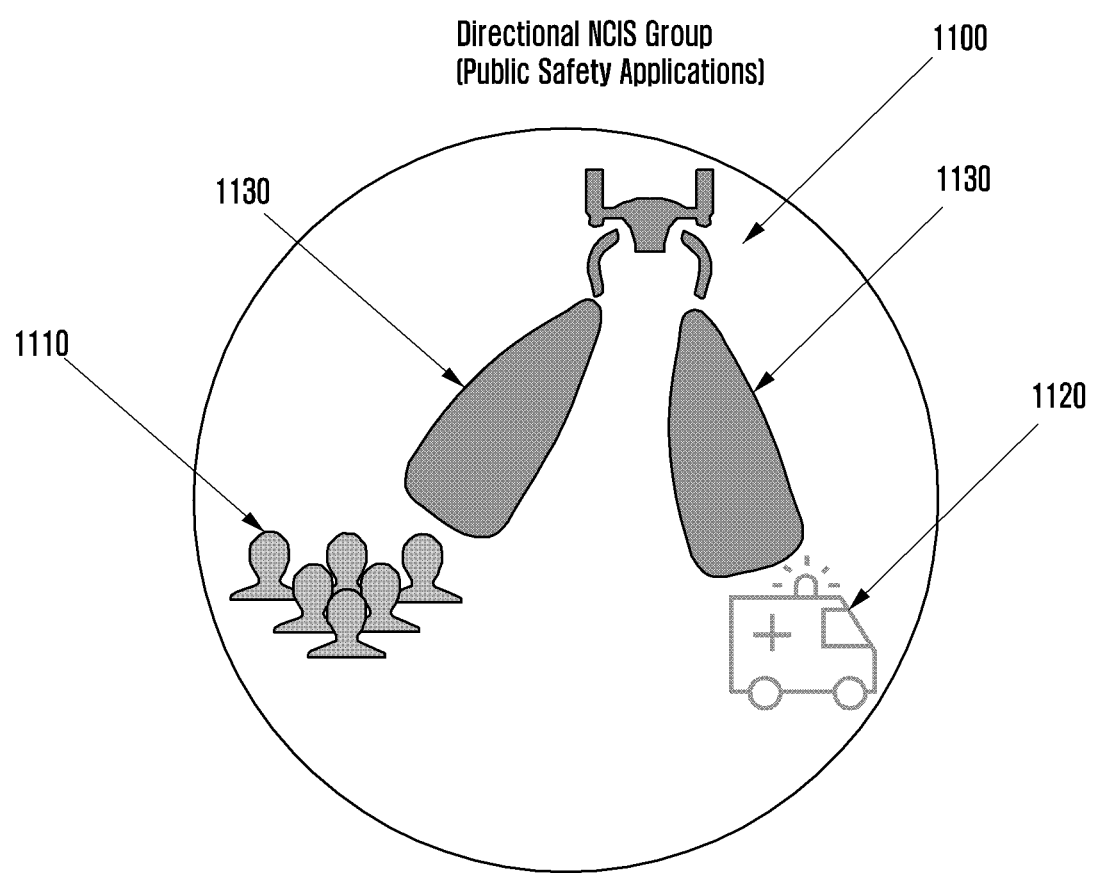
FIG. 11 illustrates sample environments in which embodiments of the disclosure find utility.

As an example, in an interactive case like a stadium, a concert or an opera house, where users can share their experience via augmented reality/virtual reality (AR/VR) applications, a user is more interested in certain directions, i.e. seat views with very different angles from his/her own. In a similar manner, when it comes to public safety cases addressing emergency situations within such public venues, directionality of proximity services can become equally important to minimize any discovery latency, to ensure reliability of transmission and, more importantly, to achieve accurate situational awareness (e.g. by identifying critical areas for evacuation, or suitable non designated areas for assembly points via AR/VR assisted drones). FIGS. 10 and 11 illustrate two example cases of directional applications for both commercial and public safety usage.

FIG. 10 illustrates a concert or sports stadium. Located at a relatively central location is a first user (1010). An NCIS group may be formed with directionally diverse users (1020) and (1030) who are located at positions that offer them different viewpoints to each other. If these users wish to share images or video to create an AR/VR experience, then directional communication between them, as shown by the shaded beams (1040) may be advantageous.

FIG. 11 illustrates a drone (1100) operable in a public safety NCIS scenario. In this case the drone (1100) wishes to communicate with a crowd (1110) and an emergency vehicle (1120). By use of directional beams (1130) as shown, embodiments of the disclosure can offer advantages as will be described.

Embodiments of the present disclosure provide enhanced support for a 5G System so that it can offer directional proximity-based services with one common architecture that can be used for both public safety and commercial related applications.

Embodiments of the disclosure provide novel methods, procedures, service flows and triggers related to how proximity-based services may be enhanced to support and leverage inherent directionally within some services.

Embodiments of the disclosure provide means whereby a 5G Core (5GC) can configure a UE or group of UEs for proximity services, based on the number of directions of interest and corresponding beam management support. The directions of interest are set relative to a given UE with respect to surrounding points of interest.

Figure 12:
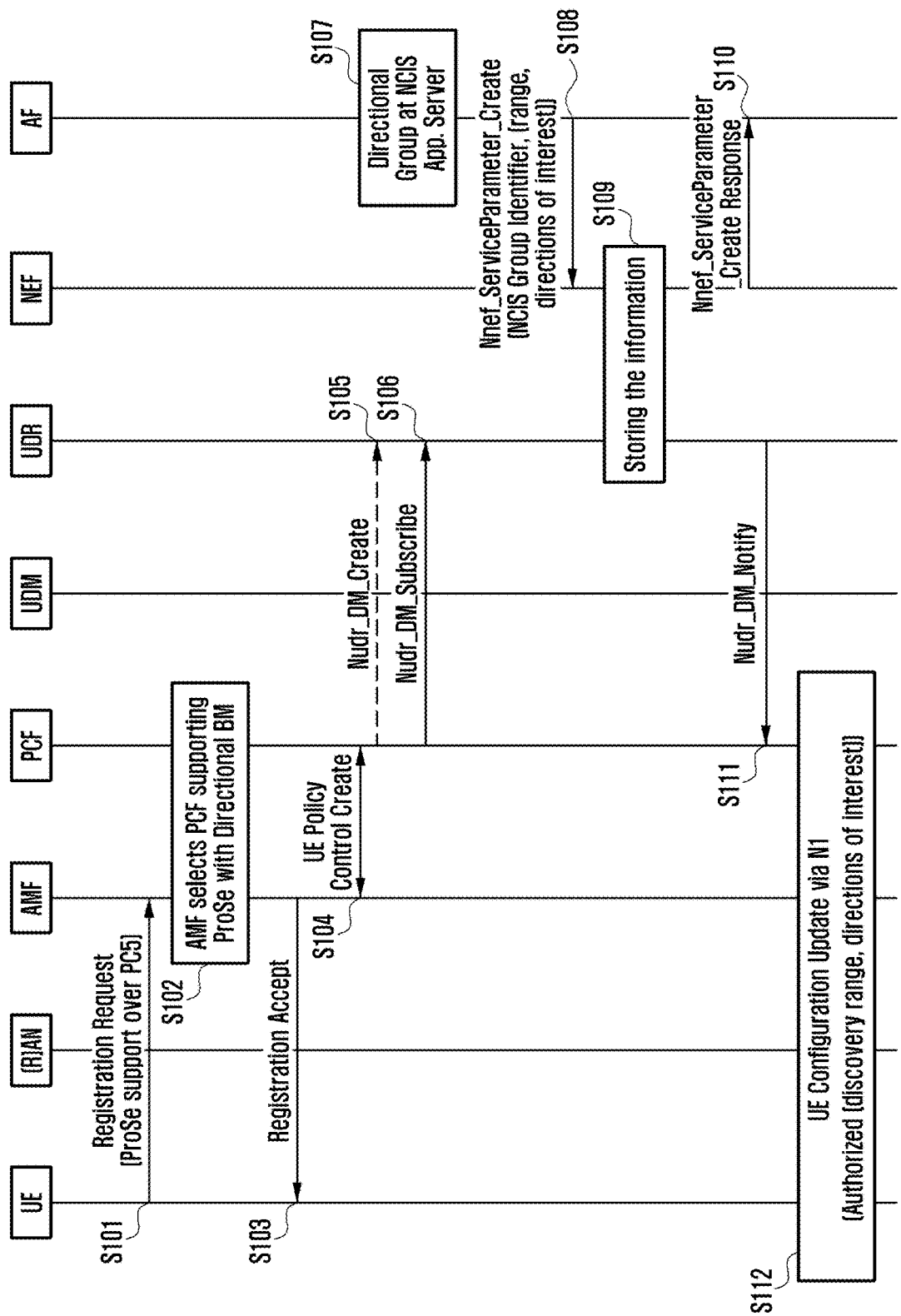
FIG. 12 illustrates service flow steps in accordance with an embodiment of the present disclosure.

FIG. 12 illustrates a first embodiment, relating to an application-driven user configuration update.

FIG. 12, and the following figures, show various network functions/entities, whose functions and definitions are known in the art in at least: 3GPP TS 23.501, 3GPP TS 23.502 and 3GPP TS 23.503. The various known functions of these network functions/entities is varied/enhanced as set out in the following paragraphs.

For completeness, the various functions/entities shown may be:
- user equipment: UE, (radio) access network: (R)AN, access and mobility management function: AMF, session management function: SMF, user plane function: UPF, policy control function: PCF, user data management: UDM, unified data repository: UDR, network exposure function: NEF, application function: AF, charging function: CHF The inputs from directional proximity-based application (at AF-level) is provisioned to corresponding UEs as part of NR PC5 Policy parameters. In particular, directional proximity parameters may be optionally used as part of PC5 QoS mapping configuration to set a tuple of (range, directions of interest) per UE (or set of UEs). This is in addition to standardized PC5 5QIs (PQI) defined for ProSe communication over NR based PC5.

S101. UE indicates ProSe Support, with Beam Management (BM) capability during registration request to AMF.

S102-S106. If UE is authorized to use directional NCIS services, AMF selects the PCF (via NRF) which supports directional services and establishes a UE policy association with the PCF for Policy/Parameter delivery. PCF may store information like the permanent equipment identifier (PEI) or the OS Id within UDR as part of "UE context policy control data". The PCF also subscribes to notification of the data modification in the UDR.

S107. At AF level, NCIS (directional) group is created (or updated) with inputs of specific NCIS group identifier(s) and tuple of (range, directions of interest).

S108. The AF invokes a ServiceParameter_Create (or Update) operation through NEF providing the above parameters along any other NCIS group parameters.

S109-S110. The NEF stores the AF provided information in the UDR and responds to the AF request.

S111. The PCF receives the notification of data change from UDR (as already subscribed to).

S112. PCF creates a new UE policy container for UE access selection and PDU Session selection including authorized tuple of (discovery range, directions of interest). Then, it initiates policy provisioning via invoking N1N2MessageTransfer service provided by AMF. The AMF transfers transparently the UE Policy container to the corresponding UEs via N1 (DL NAS TRANSPORT message).

In the service flow of FIG. 12, PCF role can be replaced with a newly defined ProSe Function within service-based 5GC that takes over the relevant service authorization and policy updates roles. The ProSe Function may receive AF-level group creation (update) notifications either through UDR as outlined above or alternatively it may directly get updates from AF (via NEF).

Figure 13:
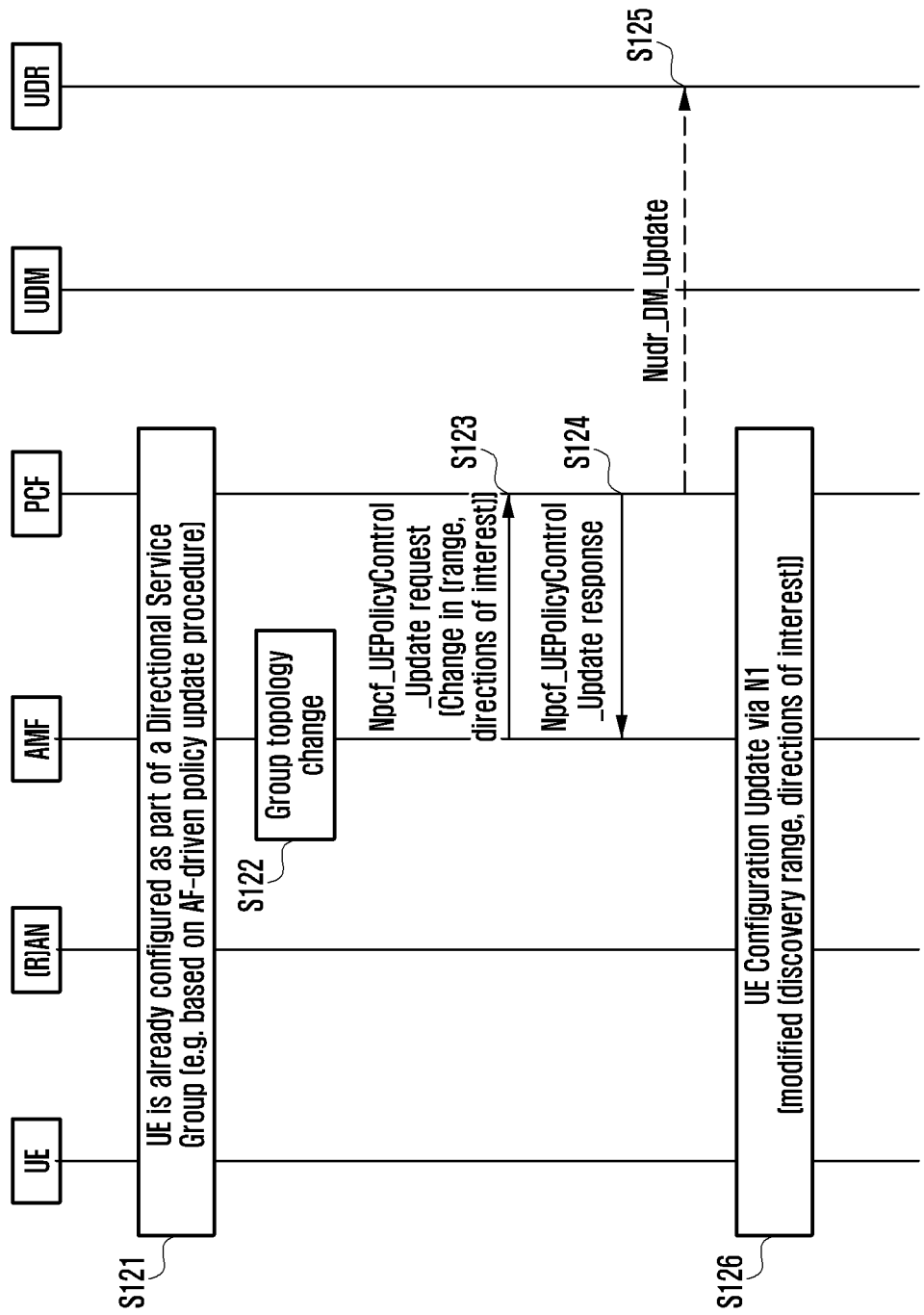
FIG. 13 illustrates service flow steps in accordance with an embodiment of the present disclosure.

FIG. 13 illustrates a second embodiment, relating to an AMF-driven directional group policy update.

S121. UE is already configured as part of a directional service group (e.g. based on AF-driven procedure in FIG. 12.)

S122. AMF decides that a group policy update is needed based on a significant group topology change. AMF may rely on location reporting information through NG-RAN as covered in 3GPP SA2, TS23.502 or other location services (LCS) procedures through gateway mobile location centre (GMLC).

S123. AMF invokes "UEPolicyControl_Update" service from PCF including any changes in tuple of (discovery range, directions of interest) based on group location updates.

S124. The PCF generates a new UE policy container including modified tuple of (discovery range, directions of interest) and responds to AMF request.

S125. The PCF may also update "UE context policy control data" within UDR.

S126. The PCF initiates another policy provisioning via invoking N1N2MessageTransfer service provided by AMF. The AMF transfers transparently the UE Policy container to the corresponding UEs via N1 (DL NAS TRANSPORT message).

In service flow of FIG. 13, PCF role can be replaced with a newly defined ProSe Function within service-based 5GC that takes over the relevant service authorization and policy updates roles. The ProSe Function may still update UDR as outlined above or alternatively it may only communicate with the AF (via NEF).

Figure 14:
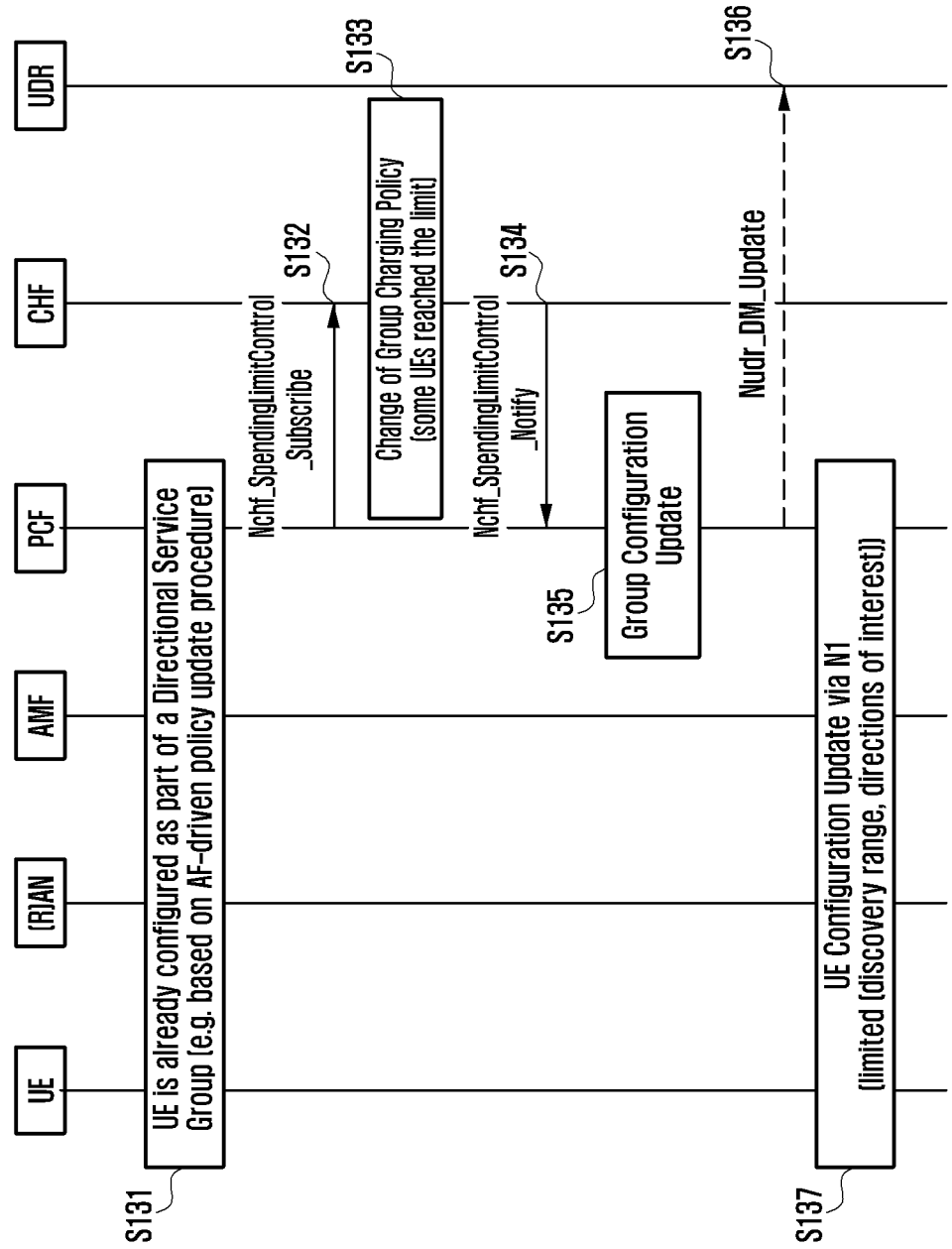
FIG. 14 illustrates service flow steps in accordance with an embodiment of the present disclosure.

FIG. 14 illustrates a third embodiment, relating to CHF-driven directional group policy update.

A given user can be linked to other users in directional proximity whist they reach their spending limit (implying that the network cannot support that target direction anymore). Unless the given user finds an alternative user(s) to link to within the direction(s) of interest, it may face a new group topology arrangement (as such direction(s) cannot be supported anymore). Therefore, sending messages towards such direction(s) may become temporarily or permanently restricted.

S131. UE is already configured as part of a directional service group (e.g. based on AF-driven procedure in FIG. 12.)

S132. PCF subscribes to CHF for spending limit reporting (i.e. to notifications of policy counter status changes).

S133. CHF decides that some UEs within NCIS Group have reached their spending limits.

S134. CHF notifies PCF on the UEs reaching the limit based on PCF subscription.

S135. PCF decides on a group configuration update (e.g. to remove directions of interest with UEs already reaching the limits). PCF also generates a modified UE policy container including a limited tuple of (discovery range, directions of interest).

S136. The PCF may also update "UE context policy control data" within UDR.

S137. The PCF initiates another policy provisioning via invoking N1N2MessageTransfer service provided by AMF. The AMF transfers transparently the UE Policy container to the corresponding UEs via N1 (DL NAS TRANSPORT message).

In service flow of FIG. 14, PCF role can be replaced with a newly defined ProSe Function within service-based 5GC that takes over the relevant service authorization and policy updates roles. The ProSe Function may still update UDR as outlined above or alternatively it may only communicate with the AF (via NEF).

Figure 15:
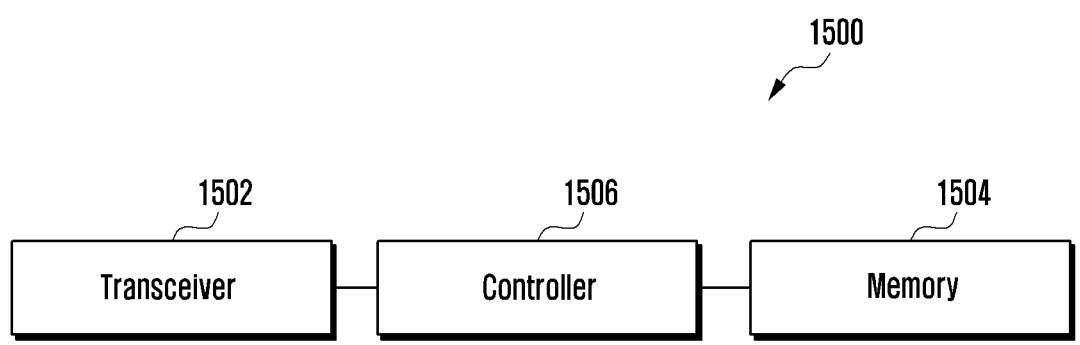
FIG. 15 illustrates a block diagram of a UE (or terminal, mobile station, wireless transmit/receive unit (WTRU)) according to embodiments of the present disclosure.

FIG. 15 illustrates a block diagram of a UE (or terminal, mobile station, wireless transmit/receive unit (WTRU)) according to the embodiments of the present disclosure.

With reference to FIG. 15, a UE (1500) of an embodiment includes a transceiver (1502), a memory (1504) and a controller (1506). The UE may be UE A (10), or UE F/G (20) according to the embodiments of the present disclosure.

The transceiver (1502) is capable of transmitting/receiving signals to/from other UE or RAN (base station) according to the embodiments of the present disclosure.

The memory (1504) is capable of storing at least one of the following: information related to the UE (1500) and information transmitted/received via the transceiver (1502).

The controller (1506) is capable of controlling operations of the UE (1500). The controller (1506) is capable of controlling the UE (1500) to perform operations related to the UE (1500) as described in the embodiments.

Figure 16:
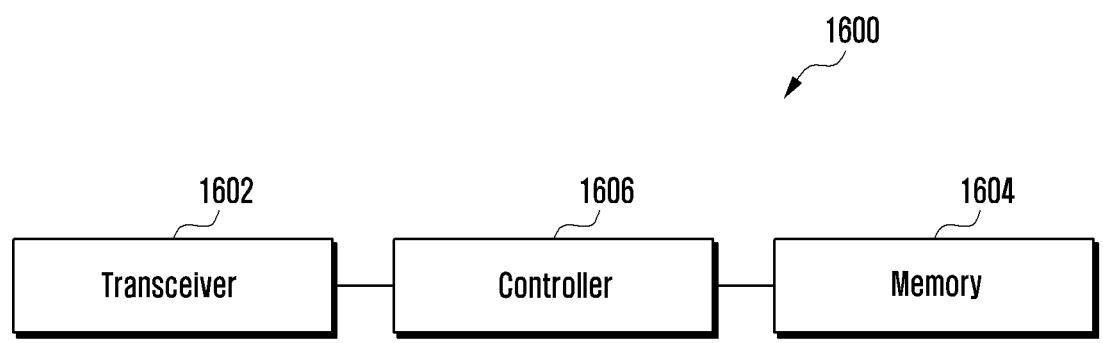
FIG. 16 illustrates a block diagram of a base station (RAN) according to the embodiments of present disclosure.

FIG. 16 illustrates a block diagram of a base station (RAN) according to the embodiments of the present disclosure.

With reference to FIG. 16, a base station (1600) of an embodiment includes a transceiver (1602), a memory (1604) and a controller (1606).

The transceiver (1602) is capable of transmitting/receiving signals to/from other UE or entities according to the embodiments of the present disclosure.

The memory (1604) is capable of storing at least one of the following: information related to the base station (1600) and information transmitted/received via the transceiver (1602).

The controller (1606) is capable of controlling operations of the base station (1600). The controller (1606) is capable of controlling the base station (1600) to perform operations related to the base station (1600) as described in the embodiments.

Figure 17:
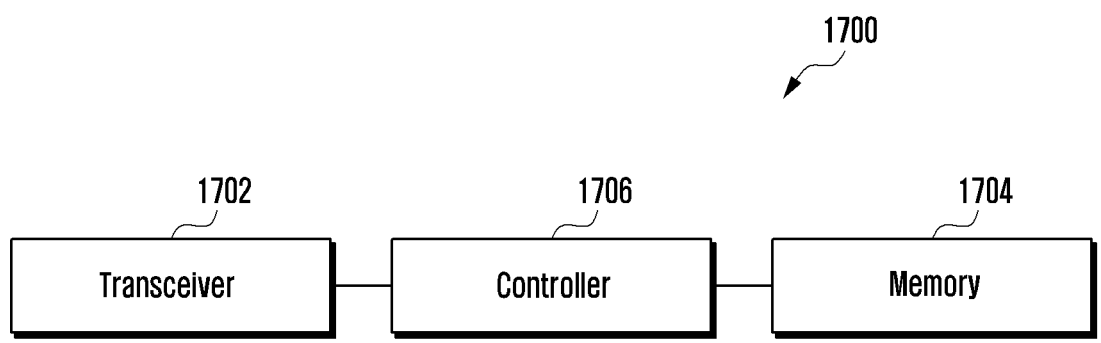
FIG. 17 illustrates a block diagram of an entity performing at least one of functions according to embodiments of the present disclosure.

FIG. 17 illustrates a block diagram of an entity performing at least one of functions according to the embodiments of the present disclosure.

With reference to FIG. 17, an entity (1700) of an embodiment includes a transceiver (1702), a memory (1704) and a controller (1706).

The transceiver (1702) is capable of transmitting/receiving signals to/from other UE, RAN, or entities according to the embodiments of the present disclosure.

The memory (1704) is capable of storing at least one of the following: information related to the entity (1700) and information transmitted/received via the transceiver (1702).

The controller (1706) is capable of controlling operations of the entity (1700). The controller (1706) is capable of controlling the entity (1700) to perform operations related to the entity (1700) as described in the embodiments.

According to the embodiments of the present disclosure, the entity (1700) may be a network entity performing at least one of access and mobility management function (AMF), session management function (SMF), user plane function (UPF), policy control function (PCF), user data management (UDM), unified data repository: (UDR), network exposure function (NEF), application function (AF), or charging function (CHF).

Embodiments proposed in the present disclosure may be implemented based on various methods, combinations, and the like. For example, UE A (10) and UE F/G (20) of FIGS. 2 to 9 may be included in a group for services (e.g. proximity services, NCIS, and the like) configured (or updated) according to FIGS. 12 to 14.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a first terminal in a communication system, the method comprising:
    performing data communication with a second terminal over a proximity service (ProSe) path;
    identifying a signal strength of the ProSe path;
    determining a path switching from the ProSe path to a 5th generation core network (5GC) path based on the signal strength of the ProSe path;
    determining first 5GC path quality of service (Qos) parameters of the first terminal and second 5GC path QoS parameters of the second terminal;
    transmitting, to the second terminal, a path switching request message including the second 5GC path QoS parameters;
    performing modification of a packet data unit (PDU) session based on the first 5GC path QoS parameters; and
    performing the data communication with the second terminal over the 5GC path.

2. The method of claim 1, wherein the path switching from the ProSe path to the 5GC path is determined in case that the signal strength of the ProSe path is below a threshold value.

3. The method of claim 1, wherein the first 5GC path QoS parameters and the second 5GC path QoS parameters are determined based on QoS parameters of the ProSe path.

4. The method of claim 1, further comprising:
    receiving, from the second terminal, an accept message in response to the path switching request message.

5. A first terminal in a communication system, the first terminal comprising:
    a transceiver; and
    a controller coupled with the transceiver and configured to:
        perform data communication with a second terminal over a proximity service (ProSe) path,
        identify a signal strength of the ProSe path, and
        determine a path switching from the ProSe path to a 5th generation core network (5GC) path based on the signal strength of the ProSe path,
        determine first 5GC path quality of service (QOS) parameters of the first terminal and second 5GC path QoS parameters of the second terminal,
        transmit, to the second terminal, a path switching request message including the second 5GC path QoS parameters,
        perform modification of a packet data unit (PDU) session based on the first 5GC path QoS parameters, and
        perform the data communication with the second terminal over the 5GC path.

6. The first terminal of claim 5, wherein the path switching from the ProSe path to the 5GC path is determined in case that the signal strength of the ProSe path is below a threshold value.

7. The first terminal of claim 5, wherein the first 5GC path QoS parameters and the second 5GC path QoS parameters are determined based on QoS parameters of the ProSe path.

8. The first terminal of claim 5, wherein the controller is further configured to:
    receive, from the second terminal, an accept message in response to the path switching request message.

* * * * *